United States Patent
Leblanc

(10) Patent No.: US 8,533,447 B2
(45) Date of Patent: Sep. 10, 2013

(54) METHOD AND DEVICE FOR MODULAR CONFIGURATION DEPLOYMENT AT RUN TIME

(75) Inventor: David Leblanc, Gloucester (CA)

(73) Assignee: Wind River Systems, Inc., Alameda, CA (US)

( * ) Notice: Subject to any disclaimer, the term of this patent is extended or adjusted under 35 U.S.C. 154(b) by 388 days.

(21) Appl. No.: 12/903,421

(22) Filed: Oct. 13, 2010

(65) Prior Publication Data

US 2012/0060021 A1    Mar. 8, 2012

Related U.S. Application Data

(60) Provisional application No. 61/380,881, filed on Sep. 8, 2010.

(51) Int. Cl.
  *G06F 9/00*   (2006.01)
  *G06F 9/24*   (2006.01)
  *G06F 12/00*  (2006.01)

(52) U.S. Cl.
  USPC .................................. 713/2; 713/1; 711/103

(58) Field of Classification Search
  USPC .......................................................... 713/1, 2
  See application file for complete search history.

(56) References Cited

U.S. PATENT DOCUMENTS

| | | | | |
|---|---|---|---|---|
| 7,234,049 | B2 * | 6/2007 | Choi et al. | 713/1 |
| 7,293,166 | B2 * | 11/2007 | Nguyen et al. | 713/1 |
| 7,694,169 | B2 * | 4/2010 | Slater et al. | 714/4.1 |
| 7,761,864 | B2 * | 7/2010 | White et al. | 717/168 |
| 8,037,243 | B1 * | 10/2011 | Gasser et al. | 711/114 |
| 8,195,930 | B2 * | 6/2012 | Lin | 713/2 |

\* cited by examiner

*Primary Examiner* — Suresh Suryawanshi
(74) *Attorney, Agent, or Firm* — Fay Kaplun & Marcin, LLP

(57) ABSTRACT

A device includes a data interface and a memory. The memory includes a first memory area and a second memory area. The first memory area stores a base module including an operating system and boot logic operative to load a further module. The second memory area stores a module comprising a software application. The first memory area and the second memory area do not reside within a file system.

22 Claims, 4 Drawing Sheets

METHOD AND DEVICE FOR MODULAR CONFIGURATION DEPLOYMENT AT RUN TIME

BACKGROUND

Live USB devices are commonly used for booting host computing systems to run guest computing environments and software not present on the host computing system. Such devices may enable deployment of software to multiple users with minimal installation-related effort. However, standard live USB implementations may suffer from security vulnerabilities and may also require significant effort in the duplication of existing devices.

SUMMARY OF THE INVENTION

A device including a data interface and a memory. The memory includes a first memory area and a second memory area. The first memory area stores a base module including an operating system and boot logic operative to load a further module. The second memory area stores a module comprising a software application. The first memory area and the second memory area do not reside within a file system.

A method including generating a module comprising a software program, generating a base module comprising an operating system and boot logic operative to load the module, generating a compound module including the base module and the module, and writing the compound module to a memory of a device. The compound module is written to a portion of the memory that does not include a file system.

A computing system including a computing device and a further device. The computing device includes a memory, a processor, a user interface, and a data interface. The further device includes a further data interface and a further memory. The further memory includes a first memory area and a second memory area. The first memory area stores a base module comprising an operating system and boot logic operative to load a further module. The second memory area stores a module comprising a software application. The first memory area and the second memory area do not reside within a file system. When the computing device and the further device are connected via the data interface and the further data interface, and when the computing device is initiated, the computing device operates using the operating system stored in the further memory, and the boot logic loads the module.

DETAILED DESCRIPTION

Figure 1:
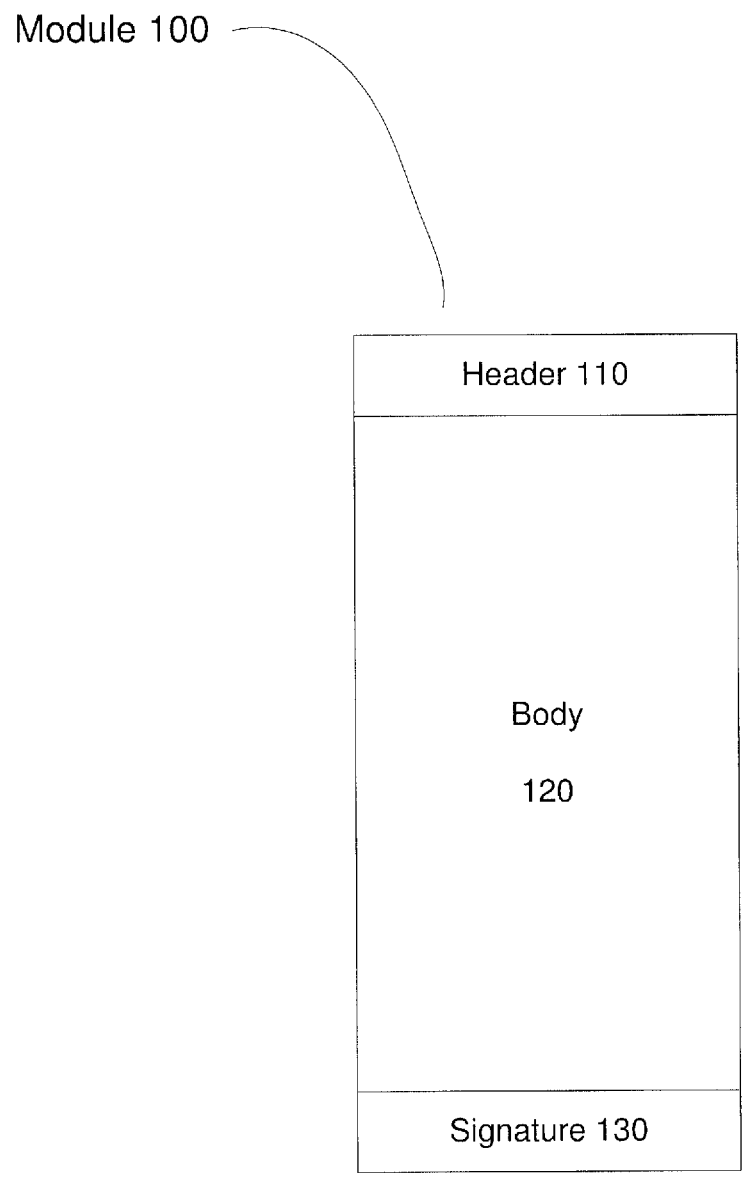
FIG. 1 illustrates a schematic view of an exemplary module according to the exemplary embodiments.

The exemplary embodiments may be further understood with reference to the following description and the appended drawings, wherein like elements are referred to with the same reference numerals. The exemplary embodiments describe devices and methods for modular deployment of software configurations at run time, such as by means of a USB device.

A "Live USB" is a USB device, such as a USB flash drive or USB hard drive, that contains a full operating system and can be booted by a computing system including, among other components, a processor and a USB interface capable of communicating with the Live USB. A "Live CD" provides the same capabilities in an optical storage medium, such as a computer-readable CD or DVD; however, those of skill in the art will understand that a Live USB may provide greater capabilities to save data, such as settings or software, onto the Live USB device than does a Live CD, such as if a Live CD is embodied in a non-rewritable CD-ROM. Live USB devices may typically be used in embedded computing systems for administration, testing, or maintenance, without the need to install software onto the local storage of the system loading the Live USB device.

A typical Live USB may device format the storage space of the USB device into a conventional DOS-based file system. The boot logic, operating system, and other software may then be stored within the context of this file system. This file system may provide deficiencies, however. In order to store persistent data (e.g., data that will be stored during one boot instance and available during subsequent boot instances), read-write access to the file system is required by users of the Live USB device; however, read-write access may compromise the security of the system, since users may potentially corrupt the file system, rendering the Live USB device unusable. Further, stability issues for the DOS-based file system drivers in Linux may limit the size of the persistent data to 2 GB or less, which may be limiting for some applications.

The exemplary embodiments will be described with reference to the term "modules", which represent segments of data including material serving a specific purpose. FIG. 1 schematically illustrates an exemplary module 100 as described herein. In a preferred embodiment, the module 100 may be aligned with respect to 512-byte sectors of data, though this may vary among different embodiments. The exemplary module 100 includes three main portions. The first portion is a header 110, which may occupy one sector of data (or more if required), and may carry important information about the module 100. The information in the header 110 may include the name of the module 100, the purpose of the module 100, requirements to execute the module 100, etc.

The second portion of the exemplary module 100 is a body 120. The size of the body 120 may vary depending on the requirements and purpose of the module 100; it may be on the order of megabytes or even gigabytes. The body 120 may typically include a file system image corresponding to a function served by the module 100 (e.g., a software application). The third portion of the exemplary module 100 is a signature 130. The signature 130 may typically occupy one sector of data, and may include information that can be used to verify the validity, authenticity and completeness of the module 100. As will be apparent to one of skill in the art, the module 100 may be intended to be modular and portable to varying environments; thus, it may typically not include anything specific to a particular operating environment.

Figure 2:
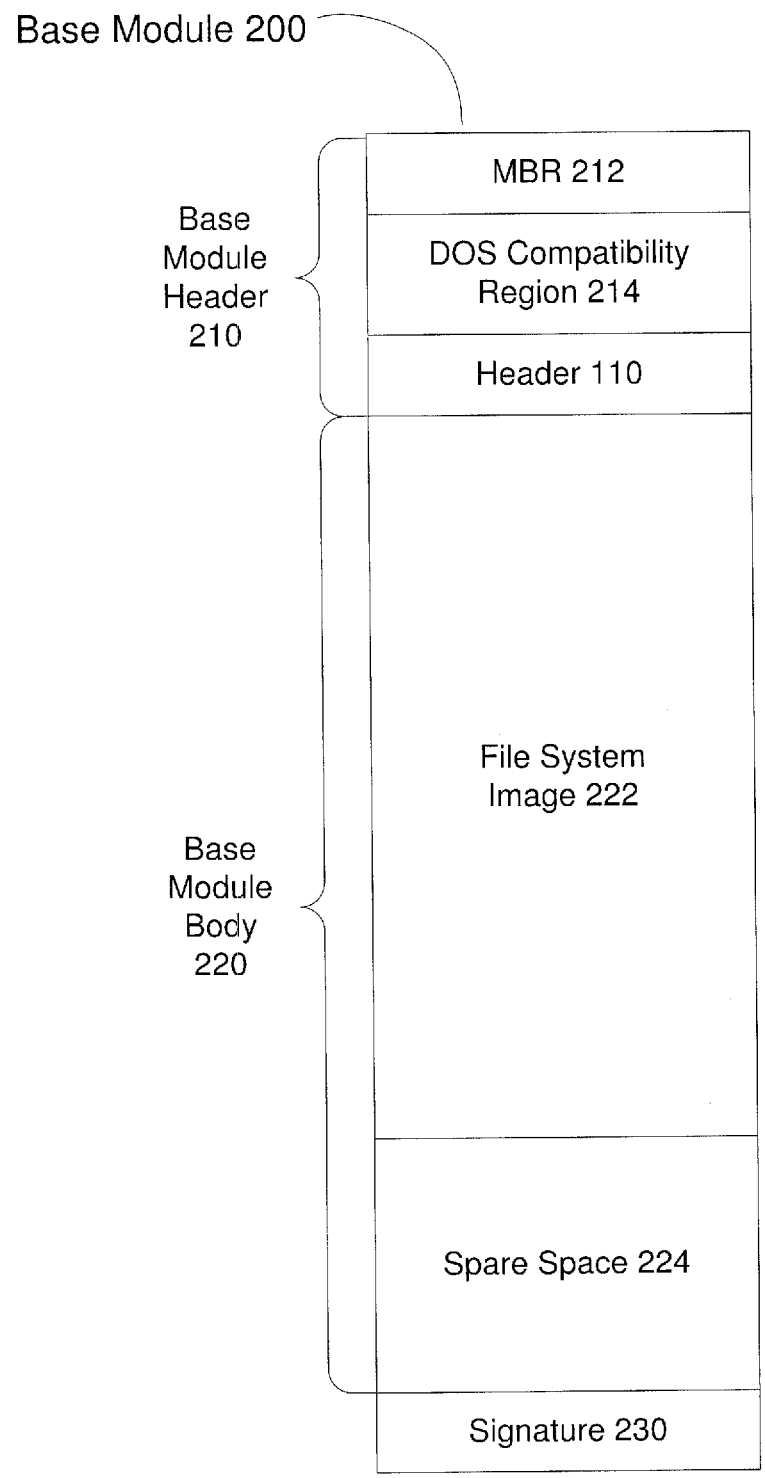
FIG. 2 illustrates a schematic view of an exemplary base module according to the exemplary embodiments.

FIG. 2 illustrates a base module 200, which may be a specific implementation of a generic module 100 as illustrated schematically in FIG. 1. The base module is a specialized module that may be used to provide a bootable host environment, such as an operating system. Though a base module 200 contains all of the elements of a generic module 100 as described above, a base module 200 may have specific functions corresponding to the function of the base module 200 to provide a bootable host environment. A base module 200 may include a base module header 210; however, unlike the header 110, the base module header 210 serves a variety of purposes beyond simply containing module information. The base module header 210 includes a master boot record ("MBR") 212, which may also be referred to as a boot sector. The MBR 212 may typically occupy one sector of data. The base module header 210 may also include a DOS compatibility region 214, pursuant with the boot requirements of many standard computing systems. In one exemplary embodiment, the DOS compatibility region 214 may occupy 61 sectors of data. Last, the base module header 210 may include a header 110 as described above.

The base module 200 also includes a base module body 220. The base module body 220 may comprise a file system image 222 (e.g., a FAT32 file system image), providing a rootfs image and a boot loader configuration for loading and starting an operating system. The file system image 222 may, in a preferred embodiment, be at a bare minimum size capable to accommodate the host operating system, in order to maximize unused space in a device including the base module 200; this size may typically be on the order of 500 to 750 megabytes. The base module body 220 may also include a fixed amount of spare space 224, that may be used to install additional data, such as license files, startup scripts, patches, etc. from outside a booted environment. The spare space 224 may typically be smaller than the file system image 222, and its size may be configurable by an author of the base module 200. In one preferred embodiment, the spare space 224 may be sized at 100 megabytes. Last, the base module 200 may include a signature 230, which may be substantially similar to the signature 130 described above. In addition to the normal boot sequence of the host operating system stored in the base module body 220, the base module 200 may include "glue logic" as a portion of the initial boot process, which may interface the base module 200 with other modules 100 stored on the same device.

Figure 3:
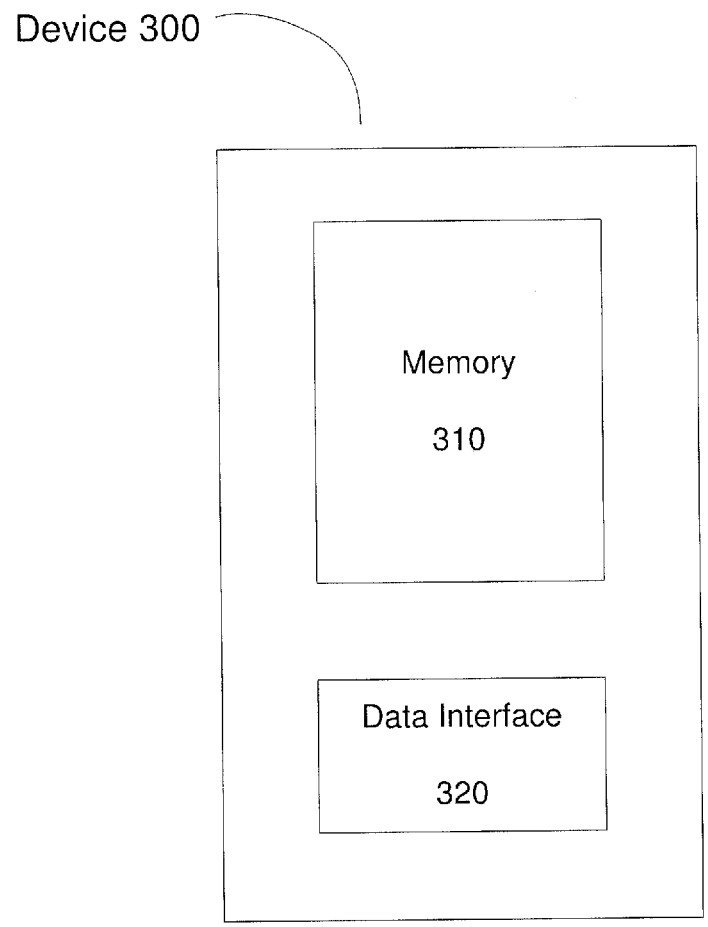
FIG. 3 illustrates a schematic view of an exemplary device according to the exemplary embodiments.
Figure 4:
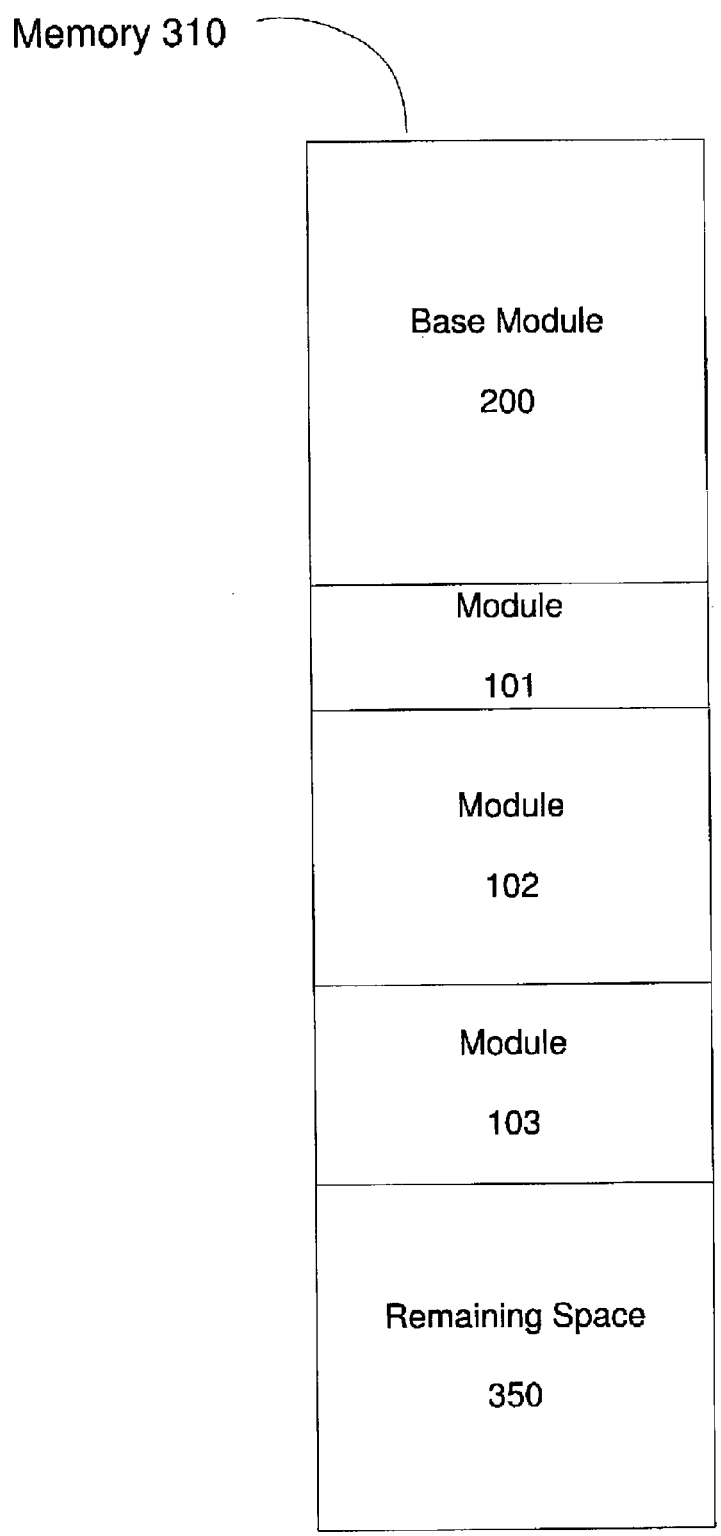
FIG. 4 illustrates a schematic view of the contents of a memory of the device of FIG. 3 according to the exemplary embodiments.

A device 300, as illustrated schematically in FIG. 3, may include a memory 310 and a data interface 320. In a preferred embodiment, the memory 310 may be a flash memory and the data interface 320 may be a USB data interface. In other embodiments, the memory 310 may be optical storage (e.g., a CD or DVD) or magnetic storage (e.g., a hard disc). FIG. 4 schematically illustrates the contents of the memory 310. In an exemplary device, the memory 310 may include a base module 200, and three modules 101, 102 and 103, which may be specific versions of the module 100 operable to perform specific functions. Those of skill in the art will understand that the modules 101, 102 and 103 may be similar or different depending on their functions. The memory 310 may also include remaining space 350, which may be remaining storage space in the memory 310 after all modules have been written to the device 300. When the device 300 is initiated, the glue logic of the base module 200 initiates the operation of the modules 101, 102 and 103. This may be accomplished by scanning the portion of the device 300 beyond the base module 200 for an indication of further modules, such as headers 110 as described above.

The device 300 may be created and distributed, for example, by a software developer that has developed the modules 101, 102 and 103 to monitor the performance of a computing system which may be booted using the device 300, or for various other purposes. As described above, modules can be created, distributed and used separately, and their contents may generally be independent of one another. Alternatively, two or more modules may be strung together to form a compound module using standard file manipulation utilities. A device 300 may typically be created by copying a compound module, including a base module such as the base module 200 and one or more other modules such as the module 100, directly to the memory 310 via the data interface 320 using standard file manipulation utilities, such as with LINUX command line tools. The boot logic of the base module 200 may be able to enumerate the modules present on the device 300 due to the well-defined interfaces of the modules. The boot logic may also be able to utilize the remaining space 350 as a read-write overlay capturing changes made within the environment of the operating system in the file system image 222. Because the sizes of the devices are determined at boot time, modules may be installed on devices of different sizes, which may improve the versatility of the modules. Further, because the overlay may reside in non-volatile storage such as a flash USB memory, changes may be kept indefinitely. Alternatively, the file system embodied in the image 222 may be reverted to its initial state simply by invalidating the overlay; in this case, all changes will be forgotten, and the file system will appear in its original state on the next reboot.

Modules such as modules 101, 102 and 103 may be added to the device memory 310 by standard file manipulation utilities; however, they may be concatenated with the base module 200 and do not reside within a file system or partition, but rather are stored "out of band" in space that is otherwise unused. Modules may be discovered and mounted at boot time by logic in the MBR 212; however, the modules may not be discoverable when the device 300 is connected to a system that is already running. Rather, in this case only the base file system of the base module 200 would be detected. The remaining space 350 may then be separately mapped for use as described above.

In another exemplary embodiment, the device 300 may be configured to provide multiple software configurations to the user by means of what will be referred to herein as modtabs. A modtab may correspond to a particular configuration, and may contain a list of modules to be used by the corresponding configuration. For example, the device 300 and the memory 310 may include a first modtab including the first module 101 and the second module 102, and a second modtab including the first module 101 and the third module 103. Each modtab may serve a different purpose to a user of the device 300. For example, if the device 300 is provided to users for the purpose of evaluating software, the two modtabs described above may correspond to two different software products to be evaluated, with the first module 101 including core elements common to both software products, the second module 102 including elements specific to the first software product, and the third module 103 including elements specific to the second software product. In such an embodiment, the base module 200 may be configured to prompt the user, when the device 300 is booted, to select from among the modtabs available (e.g., by means of a menu or a command line argument, etc.). The base module 200 may then load only the modules corresponding to the selected modtab. Further, the device 300 may be configured to subdivide the read-write overlay in the remaining space 350 into a plurality of subdivisions, with each subdivision corresponding to each modtab of the device 300. Data relating to each modtab may be stored independently into the corresponding section of the read-write overlay in the remaining space 350, such that changes made in one modtab may have no effect on the configuration or performance of the other modtab or modtabs of the device 300.

The exemplary embodiments present a number of improvements over similar previous devices. Because the size of the DOS file system present in the exemplary embodiments may be reduced to a bare minimum size required to accommodate the core operating system, and because the overall usable space is not limited by an overall file partition size governing the device as a whole, the amount of unused space may be maximized. Thus, more space may be available for persistent read-write changes to be made to the device.

Additionally, advantages may result from the fact that subsequent modules (e.g., the modules 101, 102 and 103 described above) are added to the base module by concatenating them together, rather than within a file system or partition, and are discovered and mounted by the boot logic described above. First, the number of modules that may be added to a base module is limited only by the physical size of the device, not by the size of a DOS-based file system. Second, an added layer of security may protect the software, which may be proprietary or experimental, embodied in the modules that have been added to the base module. Because the modules are stored out of band, they do not appear when the device of the exemplary embodiments is mounted to a computing system that is already running its own operating system. Thus, unless a user wishing to tamper with the device knows specifically what to look for and uses special disk inspection tools, the modules will not be discovered.

Further advantages may result from the fact that the unused space existing beyond modules that have been written to the device (e.g., remaining space 350, as described above) may be used for read-write persistence. First, the amount of space available for this purpose is not limited by the constraints of a DOS-based file system, but, rather, only by the physical size of the device and the amount of space occupied by the modules. Thus, devices with larger physical storage may be used for this purpose without being limited to a specified size due to file system constraints. Further, because the remaining space may be the only area that can be written to under the parameters of the boot logic of the exemplary device, the device may easily be "reset" to an original configuration, such as by inserting a special marker at the beginning of the remaining space. When the device is subsequently rebooted, the base module may recognize the special marker and re-initialize the remaining space to its pristine state.

Additionally, because a compound module may be formed from a base module and one or more other modules, reproduction of a device such as the device 300 may be a simple task; the compound module may simply be written directly to the device, without recreating a file system and copying the content of the modules. Further, modules are versatile because a module performing a given task may be re-deployed among different devices serving varying broader overall functions, and even among devices embodied in different physical configurations.

It will be apparent to those skilled in the art that various modifications may be made to the exemplary embodiments, without departing from their spirit or scope. Thus, it is intended that the present disclosure cover modifications and variations provided they come within the scope of the appended claims and their equivalents.

What is claimed is:

1. A device, comprising:
    a data interface; and
    a memory comprising:
        a first memory area storing a base module comprising an operating system and boot logic operative to discover an application module at boot time and load the application module; and
        a second memory area storing the application module, the application module comprising a software application,
    wherein the first memory area and the second memory area do not reside within a file system.

2. The device of claim 1, wherein the data interface is a universal serial bus interface, and wherein the memory is a flash memory.

3. The device of claim 1, wherein the application module includes a header, a body including the software application, and a signature.

4. The device of claim 1, wherein the base module includes a master boot record, a DOS compatibility region, a header, a file system image, and a signature.

5. The device of claim 4, wherein the base module further includes spare space.

6. The device of claim 1, wherein the memory further comprises:
    a third memory area including empty space, wherein the third memory area does not reside within a file system.

7. The device of claim 6, wherein the operating system is configured to store data in the empty space, the data being retained in the empty space if the device is restarted.

8. The device of claim 1, wherein the memory further comprises:
    a third memory area storing a further application module comprising a further software application, wherein the third memory area does not reside within a file system.

9. The device of claim 1, wherein the memory further stores a plurality of configuration files, each of the configuration files identifying one or more corresponding application modules.

10. The device of claim 9, wherein, when the device is initialized, a selection of one of the configuration files is made, and wherein the corresponding application modules are loaded in response to the selection.

11. The device of claim 9, wherein the memory further includes a third memory area including empty space, wherein the third memory area does not reside within a file system, wherein the operating system is configured to store data in the empty space, the data being retained in the empty space if the device is restarted, and wherein the empty space is divided into a plurality of subdivisions, each of the subdivisions corresponding to one of the configuration files.

12. A method, comprising:
    generating an application module comprising a software program;
    generating a base module comprising an operating system and boot logic operative to discover the application module at boot time and load the application module;
    generating a compound module including the base module and the application module; and
    writing the compound module to a memory of a device, wherein the compound module is written to a portion of the memory that does not include a file system.

13. The method of claim 12, wherein the base module is configured to write data to an unused memory area, the data relating to one of the application module and the base module, wherein the data is retained when the device is restarted.

14. The method of claim 13, wherein the unused memory area is disposed in a portion of the memory that does not include a file system.

15. The method of claim 13, wherein the unused memory area is subdivided into a plurality of subdivisions, each of the subdivisions corresponding to one of a plurality of configuration files, each of the configuration files including one or more corresponding modules, wherein a user selects one of the configuration files when the device is initiated, and wherein the corresponding modules are initiated in response to the selection.

16. The method of claim 12, further comprising:
generating a further application module comprising a further software program,
wherein the compound module further includes the further application module.

17. The method of claim 16, further comprising:
generating a plurality of configuration files, each of the configuration files including one or more corresponding application modules.

18. The method of claim 17, further comprising:
initiating an operation of the device;
receiving a selection of one of the configuration files from a user; and
initiating the one or more application modules corresponding to the selected configuration file.

19. The method of claim 12, wherein the compound module is written to the memory of the device using LINUX command line tools.

20. The method of claim 12, wherein the base module includes a master boot record, a DOS compatibility region, a header, a file system image, and a signature.

21. The method of claim 12, wherein the device includes a USB data interface, and wherein the memory is a flash memory.

22. A computing system, comprising:
a computing device comprising:
   a memory;
   a processor;
   a user interface; and
   a data interface; and
a further device comprising:
   a further data interface; and
   a further memory comprising:
     a first memory area storing a base module comprising an operating system and boot logic operative to discover an application module at boot time and load the application module; and
     a second memory area storing the application module, the application module comprising a software application,
   wherein the first memory area and the second memory area do not reside within a file system,
wherein, when the computing device and the further device are connected via the data interface and the further data interface, and when the computing device is initiated, the computing device operates using the operating system stored in the further memory, and the boot logic loads the application module.

* * * * *